United States Patent
Yamada

(10) Patent No.: US 7,773,236 B2
(45) Date of Patent: Aug. 10, 2010

(54) IMAGE FORMING PROCESSING CIRCUIT AND IMAGE FORMING APPARATUS

(75) Inventor: Junji Yamada, Kanagawa-ken (JP)

(73) Assignees: Toshiba Tec Kabushiki Kaisha, Tokyo (JP); Kabushiki Kaisha Toshiba, Tokyo (JP)

( * ) Notice: Subject to any disclaimer, the term of this patent is extended or adjusted under 35 U.S.C. 154(b) by 1105 days.

(21) Appl. No.: 11/421,735

(22) Filed: Jun. 1, 2006

(65) Prior Publication Data

US 2007/0280512 A1 Dec. 6, 2007

(51) Int. Cl.
*G06F 3/12* (2006.01)
*G06K 15/00* (2006.01)

(52) U.S. Cl. ................... 358/1.1; 358/1.14; 713/323

(58) Field of Classification Search ................ 358/1.1, 358/1.14–1.18, 1.9, 305, 400, 500, 530; 399/37, 399/76–78; 713/300, 320, 323, 330, 340
See application file for complete search history.

(56) References Cited

U.S. PATENT DOCUMENTS

| | | | |
|---|---|---|---|
| 2003/0159077 A1* | 8/2003 | Matsuo et al. | 713/300 |
| 2006/0038888 A1* | 2/2006 | Kotouda | 348/211.14 |
| 2007/0211963 A1* | 9/2007 | Yamada | 382/304 |

FOREIGN PATENT DOCUMENTS

JP  2002-229666  8/2002

* cited by examiner

*Primary Examiner*—James A Thompson
(74) *Attorney, Agent, or Firm*—Patterson & Sheridan, LLP

(57) ABSTRACT

An image forming processing circuit and an image forming apparatus having a clock stop function of the invention perform, in an image forming processing process, supply of a clock for processing only in a period in which the clock is required and stop the supply of the clock for processing in a period in which the clock for processing is not required. An ASIC itself realizes a low power consumption function (a clock stop function) without requiring control from a CPU or the like as in the conventional sleep function. Thus, it is possible to effectively reduce power consumption of the ASIC compared with that in the past.

8 Claims, 5 Drawing Sheets

IMAGE FORMING PROCESSING CIRCUIT AND IMAGE FORMING APPARATUS

BACKGROUND OF THE INVENTION

1. Field of the Invention

The present invention relates to an image forming processing circuit having a clock stop function for decreasing power consumption and an image forming apparatus used in a copying machine and the like that uses the image forming processing circuit.

2. Description of the Related Art

As an electric constitution of an image forming apparatus (hereinafter, MFP) used as a copying machine or the like, circuits are integrated in a dedicated LSI (hereinafter, ASIC) as an image forming processing circuit. Therefore, power consumption of the ASIC substantially affects power consumption as a circuit portion of the electric constitution of the MFP. Thus, various proposals for realizing power saving have been made. For example, as described in JP-A-2002-229666, it is also proposed to statically stop a reference clock for a function not in use of the ASIC.

In the proposal for power saving of this type, when output is not performed in an operation of the MFP, a CPU or the like judges a state of the MFP and actuates a sleep function to realize the power saving. The sleep function is a function for activating a clock stop function for an ASIC capable of stopping a clock among ASICs on the electric constitution and stopping an internal circuit operation to reduce power consumption.

However, when the CPU or the like controls the sleep function, it is difficult to reduce power consumption by fine stop control of the clock. This is because the CPU or the like controls the clock stop function judging from an operation state of the entire MFP. In other words, since the CPU or the like manages control of the clock stop function as a system as a whole and performs activation start and activation reset control of the clock stop function, it is difficult to perform fine individual control of each ASIC. Thus, there is a problem in that a low power consumption effect is low.

DETAILED DESCRIPTION OF THE INVENTION

The invention resides in judging an operation state of an ASIC constituted as an image forming processing circuit and finely applying control of a clock stop function to a clock in operation for each ASIC to improve a low power consumption effect. Embodiments of the invention will be hereinafter explained with the attached drawings as examples.

Figure 1:
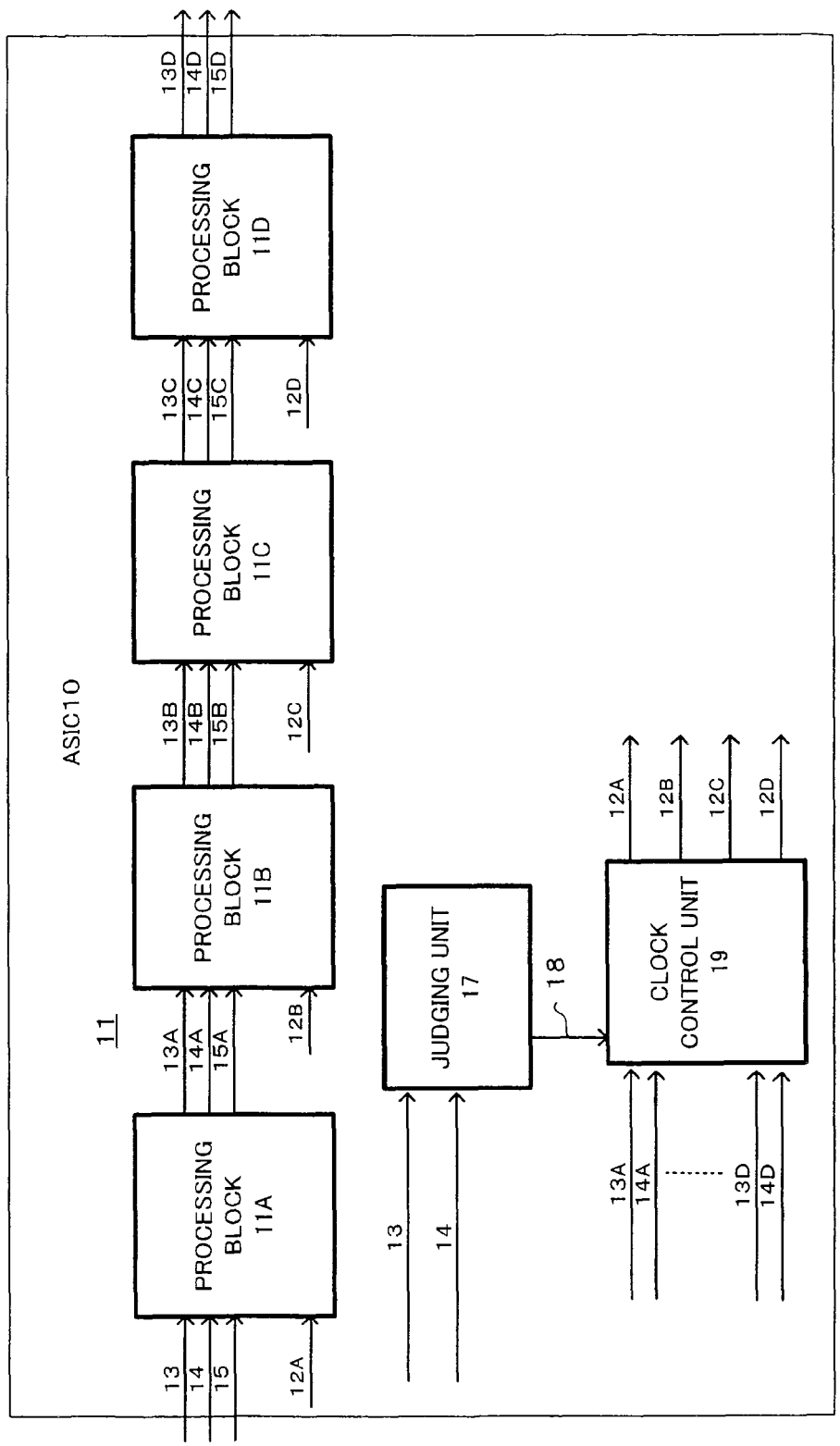
FIG. 1 is a functional block diagram showing an internal processing block structure of an image forming processing circuit according to a first embodiment of the invention.

FIG. 1 is a functional block diagram showing an internal processing block structure of an ASIC 10 constituting an image forming processing circuit according to a first embodiment of the invention. This ASIC 10 is an ASIC used in an image forming apparatus (MFP) such as a copying machine. For example, the ASIC 10 is used in a scanner unit, an image forming processing unit, and a laser output unit.

In FIG. 1, reference numeral 11 denotes an image forming processing unit. The image forming processing unit 11 has, as an internal processing function of the ASIC 10, processing blocks 11A, 11B, 11C, and 11D constituted in plural stages. These processing blocks 11A, 11B, 11C, and 11D in plural stages sequentially execute processing like pipeline processing. Clocks 12A, 12B, 12C, and 12D for processing are separately inputted to the processing blocks 11A, 11B, 11C, and 11D, respectively. The processing blocks 11A, 11B, 11C, and 11D execute predetermined processing in accordance with the clocks 12A, 12B, 12C, and 12D corresponding thereto. Therefore, when the processing is not performed, clocks are supplied to the circuit portions for processing to stop an internal operation of the image forming processing unit 11. Thus, it is possible to reduce power consumption of the respective processing blocks 11A, 11B, 11C, 11D themselves. As a result, it is possible to reduce power consumption of the ASIC 10.

A main scanning signal 13 and a sub-scanning signal 14 for specifying a two-dimensional valid image area and an image information signal 15 scanned by these main and sub-scanning signals, which are input signals to the ASIC 10, are inputted to the processing block 11A at a first stage among these processing blocks 11A, 11B, 11C, and 11D. The main scanning signal 13 is, for example, a signal for scanning one document in an X direction. The sub-scanning signal 14 is a signal for moving the main scanning direction by a predetermined pitch in a Y direction orthogonal to the X direction. Time widths of these main scanning signal 13 and sub-scanning signal 14 are set in advance such that the main scanning signal 13 and the sub-scanning signal 14 are valid for a predetermined time equivalent to scanning areas of the respective signals.

First, these signals 13, 14, and 15 are inputted to the processing block 11A at the first stage and processed. Thus, a suffix A corresponding to the processing block 11A at the first stage is affixed to output signals from the processing block 11A at the first stage, respectively.

When the main scanning signal 13 and the sub-scanning signal 14 as well as the image information signal 15 are inputted, the processing block 11A at the first stage processes the image information signal 15 in accordance with the clock 12A for a period in which the main scanning signal 13A is valid. After this processing, the processing block 11A at the first stage outputs a processing result 15A to the processing block 11B at the next stage.

The main scanning signal 13 and the sub-scanning signal 14 for the next stage involving a predetermined clock delay with respect to the pre-stage and the image information signal 15 processed at the pre-stage are inputted to the processing blocks 11B, 11C, and 11D at the second and subsequent stages.

The image information signal 15 (affixed with suffixes B, C, and D corresponding to the respective processing blocks) processed in the processing blocks 11B, 11C, and 11D at the second and subsequent stages involves the predetermined delay such as a line delay necessary for the processing up to the pre-stage until the image information signal 15 reaches the processing block blocks 11B, 11C, and 11D at the next stage because the processing at the respective stages flows as in the pipeline processing. Therefore, the main scanning signal 13 and the sub-scanning signal 14 (the suffixes B, C, and D corresponding to the respective processing blocks are also affixed to these signals) require the same delay. The predetermined delay is given to these signals by a not-shown line buffer or the like in the processing block at the pre-stage.

When the main scanning signal 13 and the sub-scanning signal 14 as well as the image information signal 15 for the next stage are inputted, the respective stage processing blocks 11B, 11C, and 11D at second and subsequent stages process the image information signal 15 in accordance with the clock 12 during a period of a predetermined time width in which the sub-scanning signal 14 and the main scanning signal 13 corresponding to the image information signal 15 are valid. After this processing, the processing blocks 11B, 11C, and 11D output processing results to the processing blocks at the next stage. It goes without saying that a processing result of the processing block 11D at a final stage is outputted as a processing result of the ASIC 10.

Reference numeral 17 denotes a judging unit for canceling the supply stop state of the clock. When the input signals to the ASIC 10, that is, the main scanning signal 13 and the sub-scanning signal 14 are inputted to the judging unit 17, the judging unit 17 detects the input signals and outputs a clock stop reset judging signal 18 in order to cancel the stop state of supply of the clocks 12A, 12B, 12C, and 12D to the processing blocks 11A, 11B, 11C, and 11D at the respective stages.

Reference numeral 19 denotes a clock control unit. When the clock supply stop reset judging signal 18 outputted from the judging means 17 is inputted to the clock control unit 19, the clock control unit 19 starts supply of the clocks 12A, 12B, 12C, and 12D corresponding to the processing blocks 11A, 11B, 11C, and 11D at the respective stages to the processing blocks. Main scanning signals 13A, 13B, 13C, and 13D and sub-scanning signals 14A, 14B, 14C, and 14D for the processing blocks 11A, 11B, 11C, and 11D at the respective stages are inputted to this clock control unit 19, respectively. When a predetermined time width elapses and the corresponding sub-scanning signal 14 and main scanning signal 13 are invalidated, the clock control unit 19 stops supply of the clock 12 to the processing block 11 that uses the main scanning signal 13 and the sub-scanning signal 14. Invalidation of a main scanning signal and a sub-scanning signal (e.g., 13A and 14A) means that processing at a processing block corresponding thereto (in this case, 11A) ends and data after the processing is outputted to a processing block at the next stage (in this case, 11B). Therefore, the clock control unit 19 detects invalidation states of the main scanning signal 13A and the sub-scanning signal 14A to stop the supply of the clock 12A to the processing block 11A corresponding thereto.

The clock control unit 19 can generate, for example, clocks of different frequencies synchronized with a reference clock inputted from the outside in a not-shown PLL (phase lock loop) or the like and supply the clocks 12A, 12B, 12C, and 12D of frequencies corresponding to the processing blocks 11A, 11B, 11C, and 11D at the respective stages to the processing blocks. As a constitution capable of performing supply stop and activation control of the clocks 12A, 12B, 12C, and 12D, for example, the clock control unit 19 only has to perform control using a gated clock or the like.

Operations will be explained. In this embodiment, in order to hold down power consumption of the ASIC 10, when the processing in the respective processing blocks 11A, 11B, 11C, and 11D is unnecessary, the clock in the ASIC 10 is stopped by the clock stop function to stop an internal operation of the ASIC 10. Therefore, the ASIC 10 has a circuit constitution for keeping a state at the time of stop for data and the like to prevent a problem in the operations of the MFP when the ASIC 10 stops the clock therein. The ASIC 10 has a circuit constitution for resuming the clock function from the state of the data and the like held at the time of clock stop reset.

As signals for automatically controlling the clock stop function, the input image valid signals (the main scanning signal 13 and the sub-scanning signal 14) used for image formation in the present state are directly used. The clock control unit 19 judges a state of the ASIC 10 (whether processing is necessary) according to the image valid signals 13 and 14 to automatically perform the control of the clock stop function (a low power consumption switching function) for each of the processing blocks 11A, 11B, 11C, and 11D.

As an internal circuit structure of the ASIC 10, the respective processing functions are divided to the processing blocks 11A, 11B, 11C, and 11D in the plural stages. Basically, data processing in synchronization with a clock for each of the blocks is passed to the next processing block. Since the processing for each of the blocks is data processing synchronizing with the clock, as processing for input data to the ASIC 10, data after the processing is outputted after an output time involving a clock delay equivalent to a line delay for the internal processing of the ASIC 10 and a clock delay for the processing. In the image forming apparatus such as an MFP, valid image areas (page images) are not continuously linked. From the first processing start to the last processing output data end, until processing data output ends in a processing function block at a final stage (in this example, 11D), processing blocks before the final stage processing (in this example, 11A, 11B, and 11C) do not require a clock for processing. Therefore, in a period in which the clock for processing is not required, the clock for processing is stopped for the processing block. As a result it is possible to hold down power consumption of the ASIC 10.

In this way, as one of ASIC functions, a non-operation state of the internal circuit of the ASIC 10 itself is detected according to an input signal state to control a function for stopping a clock of a non-operating portion. Therefore, compared with the conventional clock stop function requiring the control of the CPU or the like such as the sleep function, it is possible to perform fine control of the clock stop function during the clock operation of the ASIC 10 (in the MFP operation and at the time of sleep function OFF). This makes it possible to effectively reduce power consumption.

Figure 5:
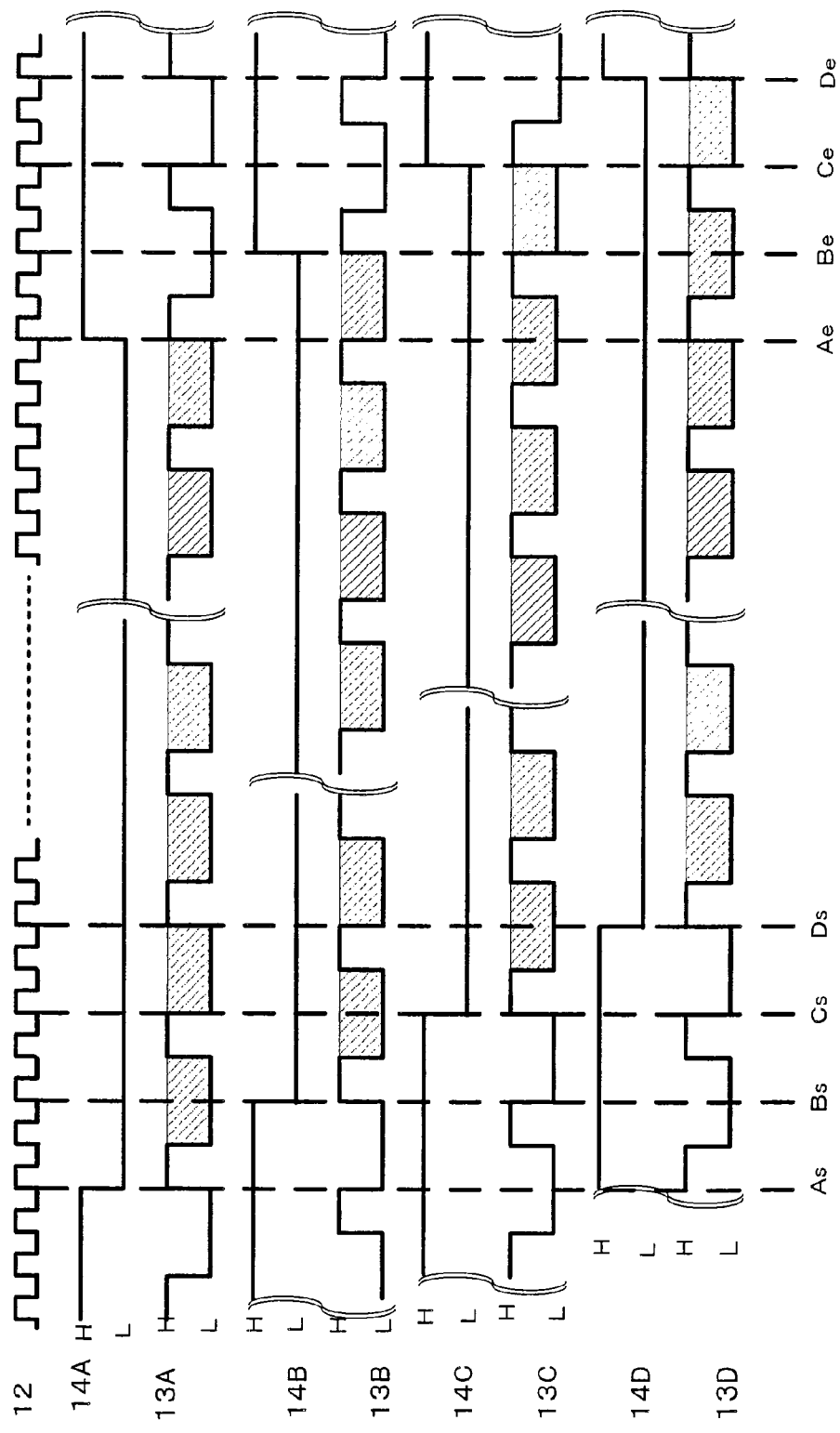
FIG. 5 is a timing chart for explaining operations according to the first embodiment of the invention.

The operations will be hereinafter explained in detail with reference to FIG. 5. Reference numeral 12 denotes a basic clock. According to conditions described later, the clock 12 forms a basis of the clocks 12A, 12B, 12C, and 12D corresponding to the respective processing blocks 11A, 11B, 11C, and 11D shown in FIG. 1.

In FIG. 1, when the image valid signals 13 and 14 and the image information signal 15 are inputted to the ASIC 10 from a not-shown pre-stage circuit outside the ASIC 10, these signals 13 and 14 are inputted to the processing block 11A at the first stage and the signals 13 and 14 are inputted to the judging unit 17 related to clock reset. Therefore, the clock stop reset judging signal 18 is outputted from the judging unit 17. The clocks 12A, 12B, 12C, and 12D corresponding to the respective processing blocks 11A, 11B, 11C, and 11D are supplied to the processing blocks from the clock control unit 19.

When the image valid signals 13 and 14 as well as the image information signal 15 are inputted to the processing block 11A at the first stage, the processing block 11A at the first stage executes predetermined processing in accordance with the clock 12A supplied to the circuit unit for processing and outputs a result of the processing to the processing block 11B at the second stage. As shown in FIG. 5, when the sub-scanning signal 14A of the processing block 11A is validated (an L level shown in the figure: a point As) and the main scanning signal 13A is validated (the L level shown in the figure), predetermined image forming processing is started in accordance with the clock 12A. This image forming processing (a hatching portion shown in the figure) is performed while the sub-scanning signal 14A and the main scanning signal 13A are valid (the L level shown in the figure). When the main scanning signal 13A and the sub-scanning signal 14A are invalidated (an H level shown in the figure) (a point Ae in FIG. 5), the clock control unit 19 detects the invalidation to stop the supply of the clock 12A to the processing block 11A at the first stage corresponding to the main scanning signal 13A and the sub-scanning signal 14A.

The point Ae when the main scanning signal 13A is invalidated means that the data output to the processing block 11B at the post-stage is finished according to the processing end in the processing block 11A. Therefore, clock stop processing for the processing block 11A at the pre-stage is activated and the supply of the clock 12A to this processing block 11A is stopped.

The processing result 15A outputted from the processing block 11A at the pre-stage is inputted to the processing block 11B at the second stage as the image information signal 15 to the next stage. Predetermined image forming processing is performed in accordance with the clock 12B while the main scanning signal 13B and the sub-scanning signal 14B are valid (the L level shown in the figure) with a predetermined delay involved. After a predetermined time, when the main scanning signal 13B and the sub-scanning signal 14B are invalidated (the H level shown in the figure) (a point Be in FIG. 5), the clock control unit 19 detects the invalidation and stops the supply of the clock 12B to the processing block 11B at the second stage.

The processing blocks 11C and 11D at the third and the subsequent stages sequentially execute the same processing as the second processing block 11B. A processing result of the processing block 11D at the final stage is outputted from the ASIC 10 as an image forming processing result. By repeating this processing while the sub-scanning signal 14 is valid (until the sub-scanning signal 14D reaches the H level), image forming processing for a valid image area (page image) is completed. In these cases, at a point when the main scanning signals 13C and 13D corresponding to the processing blocks 11C and 11D are invalidated (the H level) clock supply of the clocks 12C and 12D corresponding thereto is stopped.

In this way, in the respective processing blocks 11A, 11B, 11C, and 11D, supply of a clock for processing is performed only in a period in which the clock for processing is required. In a period in which the clock for processing is not required, the clocks for processing 12A, 12B, 12C, and 12D can be stopped for the processing blocks. Thus, it is possible to hold down power consumption of the ASIC 10.

Figure 2:
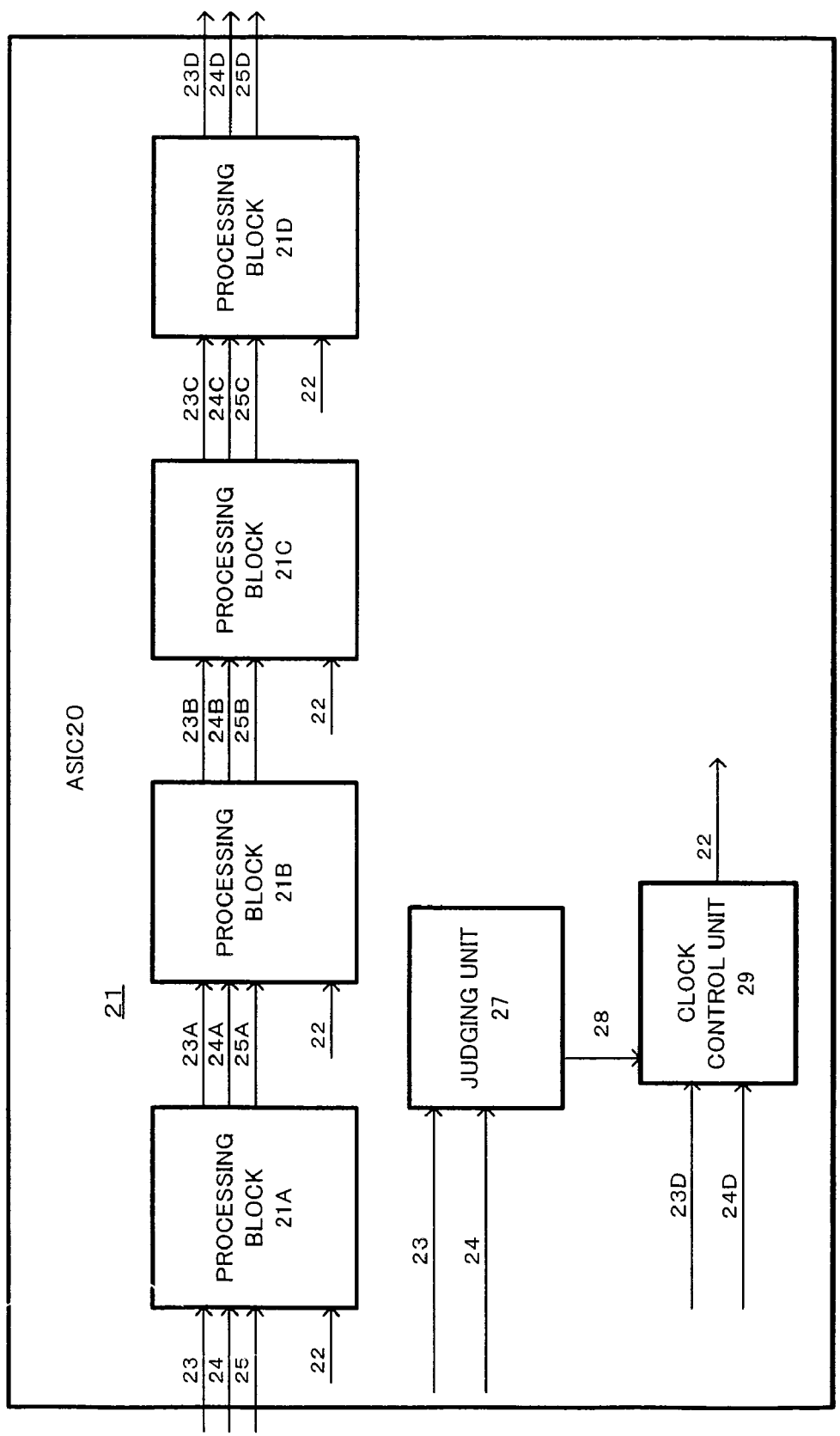
FIG. 2 is a functional block diagram showing an internal processing block structure of an image forming processing circuit according to a second embodiment of the invention.

An embodiment shown in FIG. 2 will be explained. FIG. 2 is a functional block diagram showing an internal processing block structure of an AISIC 20 that is an image forming processing circuit according to a second embodiment of the invention. Like the AISIC 10 described above, this AISIC 20 has an image forming processing unit 21. This image forming processing unit 21 has, as a processing function, processing blocks 21A, 21B, 21C, and 21D constituted in plural stages. A common clock for processing 22 is inputted to the processing blocks 21A, 21B, 21C, and 21D of the plural stages. The processing blocks 21A, 21B, 21C, and 21D execute predetermined processing in accordance with this clock 22, respectively.

A main scanning signal 23 and a sub-scanning signal 24 for specifying a two-dimensional valid image area and an image information signal 25 scanned by these main and sub-scanning signals, which are input signals to the ASIC 20, are inputted to the processing block at a first stage 21A among these processing blocks 21A, 21B, 21CC, and 21D. Time width of these main scanning signal 23 and sub-scanning signal 24 are set such that the main scanning signal 23 and the sub-scanning signal 24 are valid for a predetermined time equivalent to scanning areas of the respective signals.

These signals are sequentially inputted to the processing blocks 21A, 21B, 21C, and 21D at the respective stages and processed. Thus, suffixes A, B, C, and D corresponding to the processing blocks to which the signals 23, 24, and 25 are outputted are affixed to the signals.

The processing block 21A at the first stage processes an image information signal 25A during a period in which the main scanning signal 23A is valid and outputs a processing result to the processing block 21B at the next stage.

The main scanning signal 23 and the sub-scanning signal 24 for the next stage involving a predetermined clock delay with respect to the pre-stage and the image information signal 25 processed at the pre-stage are inputted to the processing blocks 21B, 21C, and 21D at second and subsequent stages.

The image information signals 25B, 25C, and 25D processed in the processing blocks 21B, 21C, and 21D at the second and subsequent stages involve the predetermined delay such as a line delay necessary for the processing up to the pre-stage until the image information signals 25B, 25C, and 25D reach the processing block 21B, 21C, and 21D at the next stage because the processing at the respective stages flows as in the pipeline processing. Therefore, the predetermined delay is given to the main scanning signals 23B, 23C, and 23D and the sub-scanning signals 24B, 24C, and 24D by a not-shown line buffer or the like in the processing block at the pre-stage.

When the main scanning signal 23 and the sub-scanning signal 24 as well as the image information signal 25 for the next stage are inputted, the respective stage processing blocks 21B, 21C, and 21D at the second and subsequent stages process the image information signal 25 in accordance with the clock 22 during a period of a predetermined time width in which the main scanning signal 23 corresponding to the image information signal 25 is valid. The processing blocks 21B, 21C, and 21D output processing results to the processing blocks at the next stage. It goes without saying that a processing result of the processing block 21D at the final stage is outputted as a processing result of the ASIC 20.

Reference numeral 27 denotes a judging unit for canceling the supply stop state of the clock. When the input signals to the ASIC 20, that is, the main scanning signal 23 and the sub-scanning signal 24 are inputted to the judging unit 27, the judging unit 27 detects the input signals and outputs a clock stop reset judging signal 28 in order to cancel the stop state of supply of the clock 22 to the processing blocks 21A, 21B, 21C, and 21D at the respective stages.

Reference numeral 29 denotes a clock control unit. When the clock supply stop reset judging signal 28 outputted from the judging means 27 is inputted to the clock control unit 29, the clock control unit 29 starts supply of the common clock 22 to the processing blocks 21A, 22B, 21C, and 21D at the respective stages. A main scanning signal 23D and a sub-scanning signal 24D for the processing block 21D at a final stage are inputted to this clock control unit 29. When the clock control unit 29 judges that a predetermined time width elapses and the corresponding sub-scanning signal 24D and main scanning signal 23D are invalidated, the clock control unit 29 stops supply of the clock 22 to all the processing blocks 21A, 21B, 21C, and 21D. Invalidation of the sub-scanning signal 24D at the final stage means that image forming processing for a valid image area (page image) is completed. Therefore, the clock control unit 29 detects an invalidation state of the sub-scanning signal 24D at the final stage to stop the supply of the clock 22 to all the processing blocks 21A, 21B, 21C, and 21D.

Operations will be explained. In this second embodiment, stop control of the clock 22 is performed using image valid signals (the main scanning signal 23 and the sub-scanning signal 24 as well as the image information signal 25). However, in this embodiment, taking into account a line delay time necessary for processing of all blocks and a clock delay amount necessary for processing of an internal circuit constituted in the ASIC 20, stop processing for a clock is performed after processing from input to output completion time is completed. One ASIC 20 performs clock stop control of simultaneously controlling blocks that can be stopped.

In FIG. 2, when the image valid signals 23 and 24 and the image information signal 25 are inputted to the ASIC 20 from a not-shown pre-stage circuit outside the ASIC 20, these signals are inputted to the processing block 21A at the first stage and the judging unit 27, respectively. Therefore, the clock stop reset judging signal 28 is outputted from the judging unit 27 and the clock 22 is supplied to all the processing blocks 21A, . . . , and 21D from the clock control unit 29.

When the image valid signals 23 and 24 and the image information signal 25 are inputted, the processing block 21A at the first stage executes predetermined processing in accordance with the clock 22 supplied to a circuit unit for processing thereof and outputs a result of the processing to the processing block 21B at the second stage.

Processing results of the processing blocks 21A, 21B, and 21C at the pre-stage are inputted to the processing blocks 21B, 21C, and 21D at the second and subsequent stages. The processing blocks 21B, 21C, and 21D execute predetermined processing in accordance with the clock 22 and output results of processing.

At a point when processing ends in the processing block 21D at the final stage and a result of the processing is outputted, that is, a point when both the main scanning signal 23D and the sub-scanning signal 24D at the final stage are invalidated (the H level) (a point De in FIG. 5), the clock control unit 27 detects an invalid state of these signals and stops supply of the clock 22 to all the processing blocks 21A, . . . , and 21D.

In this way, the one ASIC 20 performs the clock stop control. As functions of the ASIC 20, processing in the image valid signals 23 and 24 and the image information signal 25 is main functions. Therefore, a clock for a processed portion of data is stopped at the time when an image is invalid. Low power consumption is realized by clock stop at the time when processing is not required. In other words, stop control of the clock 22 is performed taking into account all the processing blocks 21A, . . . , and 21D of the internal circuit constituted. Blocks that can be stopped are simultaneously controlled to perform clock stop control.

In this way, the ASIC 20 itself realizes the low power consumption function (the clock stop function) using the image valid signals 23 and 24 and the image information signal 25 inputted as in the past without requiring control from the CPU or the like such as the conventional sleep function. Thus, it is possible to reduce power consumption of the ASIC 20 compared with that in the past.

Figure 3:
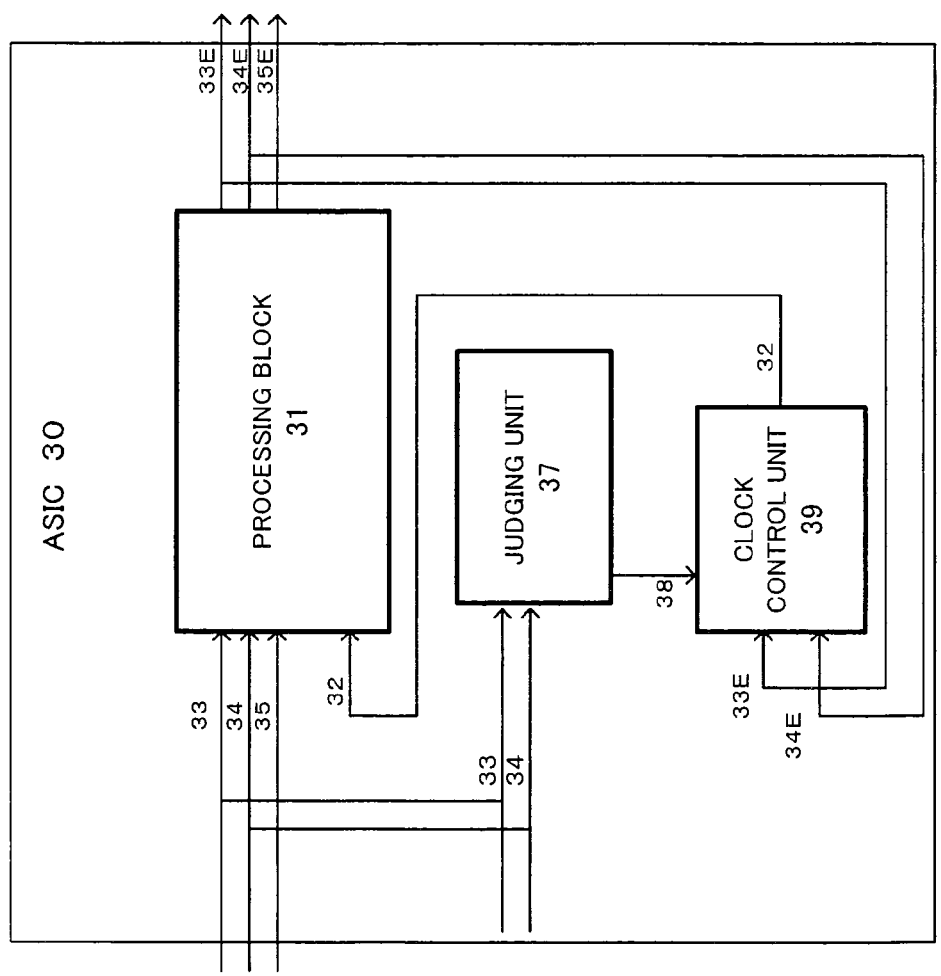
FIG. 3 is a functional block diagram showing an internal processing block structure of an image forming processing circuit according to a third embodiment of the invention.

In the embodiment shown in FIG. 2 described above, the processing of the ASIC 20 is divided to the processing blocks in plural stages as in the pipeline processing and sequentially processed. However, it is not always necessary to divide the processing to plural stages. As shown in FIG. 3, one processing block may perform predetermined image forming processing. This ASIC 30 constitutes an image forming processing unit with one processing block 31 in which all the processing blocks 21A, 21B, 21C, and 21D in FIG. 2 are integrated. A clock 32 is inputted to the ASIC 30 as a clock for processing. A main scanning signal 33 and a sub-scanning signal 34 of a predetermined time width for specifying a two-dimensional valid image area and an image information signal 35 scanned by these signals are inputted to an image forming processing unit of the ASIC 30, that is, one processing block 31. This processing block 31 processes the image information signal 35 in accordance with the clock 32 in a period in which the sub-scanning signal 34 is valid and outputs a result of this processing as a result of image forming processing by the ASIC 30.

In this case, as in FIG. 2, a judging unit 37 detects the input of the main scanning signal 33 and the sub-scanning signal 34 as well as the image information signal 35 to the processing block 31 and outputs a clock stop reset judging signal 38 in order to cancel a stop state of supply of a clock to the processing block 31. Actually, the clock stop reset judging signal 38 is outputted at a point when the sub-scanning signal 34 is validated.

A clock control unit 39 receives the clock stop reset signal 38 from this judging means 37 and starts supply of the clock 32 to the processing block 31. The main scanning signal 33 and the sub-scanning signal 34 are inputted to this clock control unit 39. When the main scanning signal 33 and the sub-scanning signal 34 are invalidated, the clock control unit 39 stops the supply of the clock 32 to the processing block 31.

Operations will be explained. In this embodiment, as in the embodiments explained above, stop control of the clock 32 is performed using image valid signals (the main scanning signal 33 and the sub-scanning signal 34). In the ASIC 30, an image forming processing unit is constituted by one processing block 31. Thus, taking into account time necessary for processing of this processing block 31, stop processing for a clock is performed after processing from input to an output completion time is completed, that is, at a point when the main scanning signal 33 and the sub-scanning signal 34 are invalidated.

In FIG. 3, when the image valid signals 33 and 34 and the image information signal 35 are inputted to the ASIC 30 from a not-shown pre-stage circuit outside the ASIC 30, these signals are inputted to the processing block 31 and the judging unit 37 as signals of information necessary for processing, respectively. Therefore, the clock stop reset judging signal 38 is outputted from the judging unit 37 and the clock 32 is supplied from the clock control unit 39 to the processing block 31.

The processing block 31 executes predetermined processing in accordance with the clock 32 supplied from the clock control unit 39 and outputs a result of the processing as a result of image forming processing by the ASIC 30.

In this embodiment, as in the embodiments described above, the ASIC 30 itself realizes the low power consumption function (the clock stop function) using the image valid signals 33 and 34 inputted as in the past without requiring control from the CPU or the like. Thus, it is possible to reduce power consumption of the ASIC 30 compared with that in the past.

An example of an image forming apparatus constituted as a copying machine or the like using such an ASIC will be explained with reference to a simple drawing.

Figure 4:
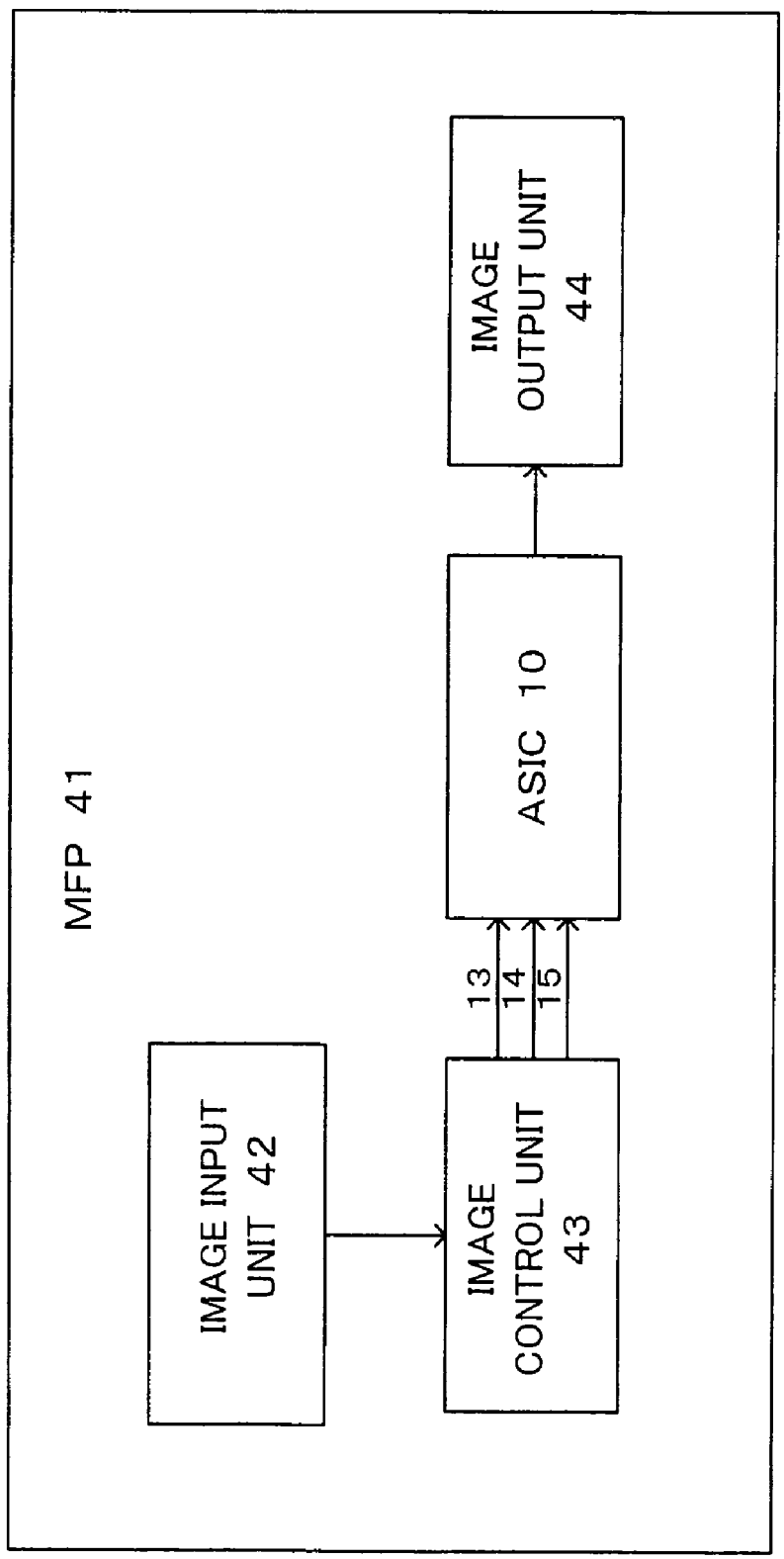
FIG. 4 is a functional block diagram showing an example of an image forming apparatus according to a fourth embodiment of the invention.

In FIG. 4, reference numeral 41 denotes an image forming apparatus (MFP) such as a copying machine. The image forming apparatus 41 has an image input unit 42 that inputs an image with an optical method. Reference numeral 43 denotes an image control unit. The image control unit 43 outputs a main scanning signal (explained as 13) and a sub-scanning signal (explained as 14) as well as an image information signal (explained as 15) scanned by the main scanning signal and the sub-scanning signal to an image forming processing circuit (explained as the ASIC 10) following the image control unit 43 in order to obtain a valid image area (page image) from image information signal inputted by the image input unit 42. Reference numeral 44 denotes an image output unit. The image output unit 44 outputs an image information signal subjected to image forming processing by the ASIC 10 at a pre-stage as information for printing.

The image control unit 43 is realized as a function of a CPU or the like that controls the entire image forming apparatus 41. The image control unit 43 outputs the main scanning signal 13 and the sub-scanning signal 14 of a predetermined time width and the image information signal 15 scanned by these scanning signals to the ASIC 10 in order to determined a valid image area as described above.

In the above constitution, in the image forming apparatus (MFP) 41 such as a copying machine, the image input unit 42 inputs an image with an optical method or the like. The image control unit 43 outputs the main scanning signal 13 and the sub-scanning signal 14 of a time width set in advance and the image information signal 15 scanned by these scanning signals to the ASIC 10 in order to determined a valid image area on the basis of the image inputted.

The ASIC 10 has the processing blocks 11A, 11B, 11C, and 11D in plural stages as explained with reference to FIG. 1. The ASIC 10 processes, on the basis of the main scanning signal 13 and the sub-scanning signal 14 inputted, the image information signal 15 as in the pipeline processing in accordance with a clock for internal processing and outputs a result of the processing to the image output means 44. The image output means 44 outputs the image information signal subjected to image forming processing by the ASIC 10 as an image with printing or the like.

In this image forming processing process, in the ASIC 10, as described above, supply of a clock is performed only in a period in which a clock for processing is required in the respective processing blocks 11A, 11B, 11C, and 11D. In a period in which the clock for processing is not required, the supply of the clock for processing to the processing blocks is stopped. Since the ASIC 10 independently performs clock stop control, it is possible to finely perform stop control compared with the conventional clock stop control based on a command of a not-shown CPU or the like. Thus, it is possible to effectively hold down power consumption of the image forming apparatus 41.

The ASIC 10 in FIG. 4 may be replaced with the ASIC 20 explained with reference to FIG. 2 or the ASIC 30 explained with reference to FIG. 3. In these cases, the main scanning signal 13 is the main scanning signal 23 or 33, the sub-scanning signal 14 is the sub-scanning signal 24 or 34, and the image information signal 15 is the image information signal 25 or 35. In any case, since the ASIC performs clock stop control independently, it is possible to finely perform stop control and effectively hold down power consumption of the image forming apparatus 41.

What is claimed is:

1. An image forming processing circuit having a clock stop function, comprising:

an image forming processing unit that has processing blocks constituted in plural stages, clocks for processing being separately inputted to the processing blocks in plural stages, the processing block at a first stage processing, when a main scanning signal and a sub-scanning signal of a predetermined time width specifying a two-dimensional valid image area and an image information signal scanned by these main and sub-scanning signals are inputted, the image information signal in accordance with the clock in a period in which the main scanning signal is valid and outputting a result of the processing, and the processing blocks at next and subsequent stages processing, when a main scanning signal and a sub-scanning signal for a next stage involving a predetermined clock delay with respect to a pre-stage and an image information signal processed at the pre-stage are inputted, the image information signal in accordance with the clocks in a period in which the main scanning signal is valid and outputting a result of the processing;

a judging unit that cancels a stop state of supply of the clocks to the processing blocks at the respective stages when the main scanning signal and the sub-scanning signal are inputted; and a clock control unit that starts the clock supply to the processing blocks at the respective stages when the clock supply stop state is canceled by the judging unit and inputs main scanning signals for the processing blocks at the respective stages, respectively, and, when a main scanning signal corresponding to a processing clock is invalidated, stops the supply of the clock to the processing block using this main scanning signal.

2. An image forming processing circuit having a clock stop function according to claim 1, wherein the clock control unit is capable of supplying clocks of frequencies corresponding to the processing blocks at the respective stages.

3. An image forming processing circuit having a clock stop function, comprising:

an image forming processing unit that has processing blocks constituted in plural stages, clocks for processing being inputted to the processing blocks in plural stages, respectively, the processing block at a first stage processing, when a main scanning signal and a sub-scanning signal of a predetermined time width specifying a two-dimensional valid image area and an image information signal scanned by these main and sub-scanning signals are inputted, the image information signal in accordance with the clock in a period in which the main scanning signal is valid and outputting a result of the processing, and the processing blocks at next and subsequent stages processing, when a main scanning signal and a sub-scanning signal for a next stage involving a predetermined clock delay with respect to a pre-stage and an image information signal processed at the pre-stage are inputted, the image information signal in accordance with the clocks in a period in which the main scanning signal is valid and outputting a result of the processing;

a judging unit that cancels a stop state of supply of the clocks to the processing blocks at the respective stages when the main scanning signal and the sub-scanning signal are inputted; and a clock control unit that starts the clock supply to the processing blocks at the respective stages when the clock supply stop state is canceled by the judging unit and inputs a sub-scanning signal for the processing block at a final stage and, when the sub-scanning signal is invalidated, stops the supply of the clocks to the processing blocks at the respective stages.

4. An image forming processing circuit having a clock stop function, comprising:
an image forming processing unit to which a clock for processing is inputted, the image forming processing unit processing, when a main scanning signal and a sub-scanning signal of a predetermined time width specifying a two-dimensional valid image area and an image information signal scanned by these main and sub-scanning signals are inputted, the image information signal in accordance with the clock in a period in which the sub-scanning signal is valid and outputting a result of the processing;
a judging unit that cancels a stop state of supply of the clock to the image forming processing unit when the main scanning signal and the sub-scanning signal are inputted; and
a clock control unit that starts the clock supply to the image forming processing unit when the clock supply stop state is canceled by the judging unit and inputs sub-scanning signal and, when the sub-scanning signal is invalidated, stops the supply of the clock to the image forming processing unit.

5. An image forming apparatus comprising:
an image control unit that generates a main scanning signal and a sub-scanning signal of a predetermined time width specifying a two-dimensional valid image area and outputs an image information signal scanned by these main and sub-scanning signals;
an image forming processing unit that has processing blocks constituted in plural stages, clocks for processing being separately inputted to the processing blocks in plural stages, the processing block at a first stage processing, when the main scanning signal and the sub-scanning signal and an image information signal scanned by these main and sub-scanning signals are inputted, the image information signal in accordance with the clock in a period in which the main scanning signal is valid and outputting a result of the processing, and the processing blocks at next and subsequent stages processing, when a main scanning signal and a sub-scanning signal for a next stage involving a predetermined clock delay with respect to a pre-stage and an image information signal processed at the pre-stage are inputted, the image information signal in accordance with the clocks in a period in which the main scanning signal for the next stage is valid and outputting a result of the processing;
a judging unit that cancels a stop state of supply of the clocks to the processing blocks at the respective stages when the main scanning signal and the sub-scanning signal are inputted; and
a clock control unit that starts the clock supply to the processing blocks at the respective stages when the clock supply stop state is canceled by the judging unit and inputs main scanning signals for the processing blocks at the respective stages, respectively, and, when a main scanning signal corresponding to a processing clock is invalidated, stops the supply of the clock to the processing block using this main scanning signal.

6. An image forming apparatus according to claim 5, wherein the clock control unit is capable of supplying clocks of frequencies corresponding to the processing blocks at the respective stages.

7. An image forming apparatus comprising:
an image control unit that generates a main scanning signal and a sub-scanning signal of a predetermined time width specifying a two-dimensional valid image area and outputs an image information signal scanned by these main and sub-scanning signals;
an image forming processing unit that has processing blocks constituted in plural stages, clocks for processing being inputted to the processing blocks in plural stages, respectively, the processing block at a first stage processing, when the main scanning signal and the sub-scanning signal and an image information signal scanned by these main and sub-scanning signals are inputted, the image information signal in accordance with the clock in a period in which the main scanning signal is valid and outputting a result of the processing, and the processing blocks at next and subsequent stages processing, when a main scanning signal and a sub-scanning signal for a next stage involving a predetermined clock delay with respect to a pre-stage and an image information signal processed at the pre-stage are inputted, the image information signal in accordance with the clocks in a period in which the main scanning signal for the next stage is valid and outputting a result of the processing;
a judging unit that cancels a stop state of supply of the clocks to the processing blocks at the respective stages when the main scanning signal and the sub-scanning signal are inputted; and
a clock control unit that starts the clock supply to the processing blocks at the respective stages when the clock supply stop state is canceled by the judging unit and inputs a sub-scanning signal for the processing block at a final stage and, when the sub-scanning signal is invalidated, stops the supply of the clocks to the processing blocks at the respective stages.

8. An image forming apparatus comprising:
an image control unit that generates a main scanning signal and a sub-scanning signal of a predetermined time width specifying a two-dimensional valid image area and outputs an image information signal scanned by these main and sub-scanning signals;
an image forming processing unit to which a clock for processing is inputted, the image forming processing unit processing, when the main scanning signal and the sub-scanning signal and an image information signal scanned by these main and sub-scanning signals are inputted, the image information signal in accordance with the clock in a period in which the sub-scanning signal is valid and outputting a result of the processing;
a judging unit that cancels a stop state of supply of the clock to the image forming processing unit when the main scanning signal and the sub-scanning signal are inputted; and
a clock control unit that starts the clock supply to the image forming processing unit when the clock supply stop state is canceled by the judging unit and inputs sub-scanning signal and, when the sub-scanning signal is invalidated, stops the supply of the clock to the image forming processing unit.

* * * * *